(12) United States Patent
Hayashi et al.

(10) Patent No.: US 6,478,376 B2
(45) Date of Patent: Nov. 12, 2002

(54) VEHICLE SEAT CONSTRUCTION

(75) Inventors: Takehito Hayashi, Aichi (JP); Koji Mizuno, Nagoya (JP); Shingo Kutomi, Aichi (JP); Yasushi Kodani, Okayama (JP); Takeshi Matsuoka, Kurashiki (JP)

(73) Assignees: Mitsubishi Jidosha Kogyo K.K., Tokyo (JP); Namba Press Works Co., Ltd., Okayama (JP)

( * ) Notice: Subject to any disclaimer, the term of this patent is extended or adjusted under 35 U.S.C. 154(b) by 0 days.

(21) Appl. No.: 09/764,061

(22) Filed: Jan. 19, 2001

(65) Prior Publication Data

US 2001/0013716 A1 Aug. 16, 2001

(30) Foreign Application Priority Data

Jan. 19, 2000 (JP) ........................................ 2000-010759

(51) Int. Cl.[7] ................................................ B60N 2/28
(52) U.S. Cl. .................................... 297/250.1; 297/253
(58) Field of Search .............................. 297/250.1, 253

(56) References Cited

U.S. PATENT DOCUMENTS

| | | | | |
|---|---|---|---|---|
| 5,466,044 A | * | 11/1995 | Barley et al. ............ | 297/253 X |
| 5,487,588 A | * | 1/1996 | Burleigh et al. ............. | 297/253 |
| 5,601,334 A | * | 2/1997 | Marks ..................... | 297/253 X |
| 5,669,663 A | * | 9/1997 | Feuerherdt ................. | 297/253 |
| 5,816,651 A | * | 10/1998 | Feuerherdt ................... | 297/253 |
| 5,918,934 A | * | 7/1999 | Siegrist ................... | 297/253 X |
| 5,941,601 A | * | 8/1999 | Scott et al. ................. | 297/253 |
| 6,017,087 A | * | 1/2000 | Anthony et al. ........ | 297/253 X |
| 6,082,818 A | * | 7/2000 | Muller .................... | 297/253 X |
| 6,082,819 A | * | 7/2000 | Jackson ....................... | 297/253 |
| 6,183,044 B1 | * | 2/2001 | Koyanagi et al. ....... | 297/253 X |
| 6,193,310 B1 | * | 2/2001 | Batalaris et al. ............ | 297/253 |
| 6,209,957 B1 | * | 4/2001 | Baloga et al. .............. | 297/253 |
| 6,234,572 B1 | * | 5/2001 | Shiino et al. ............... | 297/253 |
| 6,260,920 B1 | * | 7/2001 | Tofsen .................... | 297/253 X |
| 6,276,754 B1 | * | 8/2001 | Youssef-Agha ............. | 297/253 |

FOREIGN PATENT DOCUMENTS

| | | |
|---|---|---|
| DK | 19834312 | 2/2000 |
| JP | 11198695 | 7/1999 |

* cited by examiner

Primary Examiner—Rodney B. White
(74) Attorney, Agent, or Firm—Birch, Stewart, Kolasch & Birch, LLP

(57) ABSTRACT

A vehicle seat construction includes a reinforcement member, which is secured on a frame of a vehicle seat main body, and anchor bars fixed on the reinforcement member such that connector portions of a child seat can be brought into releasable engagement with the anchor bars, respectively. The vehicle seat main body is provided with a seat cushion and a seatback. The anchor bars are fixed on upper portions of the reinforcement member, respectively, such that guide portions for guiding the corresponding connector portions of the child seat to the associated anchor bars are located below the anchor bars.

13 Claims, 5 Drawing Sheets

VEHICLE SEAT CONSTRUCTION

BACKGROUND OF THE INVENTION a) Field of the Invention

This invention relates to a vehicle seat construction which facilitates fastening of a child seat onto a vehicle seat main body provided with a seat cushion and a seatback.

b) Description of the Related Art

When driving with a child, it has been a conventional practice from the viewpoint of safety to fix a child seat on a vehicle seat and to keep him or her sitting there. As a method for fixing the child seat on the vehicle seat, it is possible to use, for example, a seatbelt which is arranged with the vehicle seat. With this method, however, the installation work of a child seat is irksome and time-consuming.

To permit easy and quick installation of a child seat, a method has been proposed. According to this method, an anchor bar is arranged on a frame of a vehicle seat main body, and attachment members of a child seat are brought into engagement with the anchor bar. Described specifically, this method features that, as is disclosed in JP 11-198695 A, an anchor bar is arranged between rear portions of both side frames of a seat cushion, said side frames extending in a longitudinal direction of a vehicle, and fixing attachments of the child seat are connected to the anchor bar to fix the child seat on the vehicle seat main body. This method allows simple installation work for the child seat as its installation can be completed by simply pressing and securing the fixing attachments of the child seat on the anchor bar on the side of the seat cushion.

However, the arrangement of the anchor bar as mentioned above, that is, between the rear portions of both side frames of the frame of the seat cushion, said frames extending in the longitudinal direction of the vehicle, actually results in hiding of the anchor bar between a rear portion of the seat cushion and a lower portion of the seatback. This makes it difficult to determine the vertical positions of the fixing attachments of the child seat upon its installation, thereby preventing smooth installation of the child seat. In the event of a collision of the vehicle, the child seat is caused to move so that the anchor bar with which the child seat is in engagement is also caused to under go a large displacement. It is therefore necessary to apply beforehand substantial reinforcement to the anchor bar and the seat cushion frame or the like on which the anchor bar is secured.

SUMMARY OF THE INVENTION

An object of the present invention is, therefore, to provide a vehicles eat construction, which allows reduced displacements of an anchor bar on which a child seat is fixed and also facilitates installation of the child seat.

To achieve the above-described object, the present invention, in one aspect thereof, provides a vehicle seat construction comprising a vehicle seat main body having a seat cushion and a seatback; a reinforcement member secured on one of a frame of the vehicle seat main body and a floor on which the vehicle seat main body is mounted; an anchor member fixed on the reinforcement member for releasable engagement with a connector portion of a child seat; and a guide portion arranged in the reinforcement member such that the connector portion of the child seat is guided to the anchor member. In another aspect of the present invention, there is also provided a vehicle seat construction comprising a vehicle seat main body to be arranged in a vehicle; a guide portion for guiding a connector portion of a child seat to be mounted on the vehicle seat main body; an anchor member arranged for releasable engagement with the connector portion of the child seat guided by the guide portion; and a reinforcement member reinforcing the anchor member at a location thereof where the anchor member is attached. In a further aspect of the present invention, there is also provided a vehicle seat construction comprising a vehicle seat main body to be arranged in a vehicle; and a guide portion for guiding a connector portion of a child seat, said child seat being to be mounted on said vehicle seat main body, to an anchor member reinforced at a portion thereof where said anchor member is arranged such that said connector portion is brought into engagement with said anchor member. As described above, the reinforcement member is secured on the frame of the vehicle seat main body or on the floor, and the anchor bar is fixed on the reinforcement member. The anchor bar is hence provided with improved rigidity, thereby making it possible to minimize a displacement of the anchor bar in the event of a collision of a vehicle. Further, it is no longer required to apply beforehand substantial reinforcement to the frame or the like of the seat cushion. In addition, the anchor bar is provided with the guide portion which serves to guide the connector portion of the child seat to the anchor bar, so that the attachment of the child seat to the vehicle seat main body can be performed with extreme ease.

The anchor member may bean anchor bar, and the guide portion may have a guide surface arranged underneath the anchor bar. According to this preferred embodiment, the guide surface can function as the guide portion so that the connector of the child seat can be readily inserted.

The reinforcement member may have a cross-section of a substantially inverted U-shape, and the guide portion may have been formed by bending a portion of the reinforcement member. According to this preferred embodiment, the reinforcement member can be easily formed.

The anchor member may be arranged in a vicinity of a rear end portion of the seat cushion, and the seat cushion may be provided at the rear end portion thereof with a recess into which the connector portion can be inserted. According to this preferred embodiment, the reinforcement member is provided with improved rigidity and, even if a large force is exerted on the child seat in the event of a collision of the vehicle, a displacement of the anchor member can be minimized.

The seat cushion may be provided with a ticking which covers an opening of the recess, and the ticking may have a slit portion to permit insertion of the connector portion into the recess. According to this preferred embodiment, the slit portion is closed owing to the restoring force of the ticking after the child seat is removed from the seat main body. The appearance of the seat cushion is not derogated, leading to improved attraction to the eye.

The anchor member may be an anchor bar, the guide portion may have a guide surface arranged underneath the anchor bar; and the recess may be formed with a bottom surface thereof extending in continuation with the guide surface. According to this preferred embodiment, the connector portion can be smoothly inserted on and along the bottom surface of the recess and the guide surface.

The vehicle seat construction may further comprise a resin-made plate arranged on the bottom surface of the recess such that the connector portion can be brought into sliding contact with the connector portion. According to this preferred embodiment, the resin-made plate functions as a guide upon insertion of the connector portion, thereby facilitating the insertion of the connector portion of the child seat.

The plate may extend onto the guide surface. According to this preferred embodiment, the resin-made plate functions as a guide upon insertion of the connector portion, thereby facilitating the insertion of the connector portion of the child seat.

DETAILED DESCRIPTION OF THE EMBODIMENTS

Figure 1:
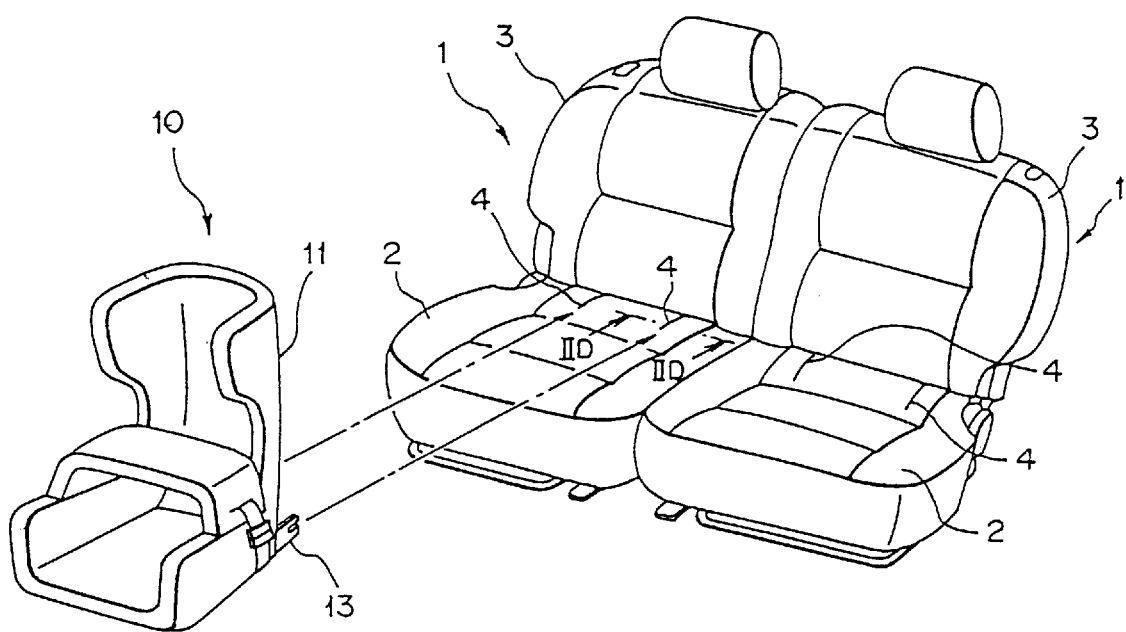
FIG. 1 is an overall perspective view of a vehicle seat construction according to a first embodiment of the present invention.

FIG. 1 illustrates a second seat having the vehicle seat construction according to the first embodiment of the present invention. This second seat is equipped with seat main bodies 1 arranged side by side. Each seat main body 1 has a seat cushion 2 and a seatback 3, and the seat cushion 2 is provided at a rear portion thereof with slit portions 4 spaced apart from each other in a lateral direction. Through these slit portions 4, a child seat 10 is attached to or detached from the seat main body 1 as needed. It is to be noted that, although the first embodiment of the present invention will be described taking the second seat as an example, the first embodiment is not limited to such second seats and is equally applicable to front passenger seats, third seats and the like.

As is shown in FIG. 1, the child seat 10 usable with the vehicle seat construction of the present invention is provided with a child seat main body 11 and connector portions 13 arranged at two locations in a rear portion of the child seat main body 11. When fastening of the child seat 10 onto the seat main body 1 is desired, it is necessary to insert the connector portions 13 into the corresponding slit portions 4 of the seat cushion 2 as indicated by two rightward arrows in FIG. 1. As a result, the connector portions 13 are brought into engagement with a below-described anchor bar as an anchor member so that the child seat 10 is fixed on the seat main body 1.

Figure 2A:
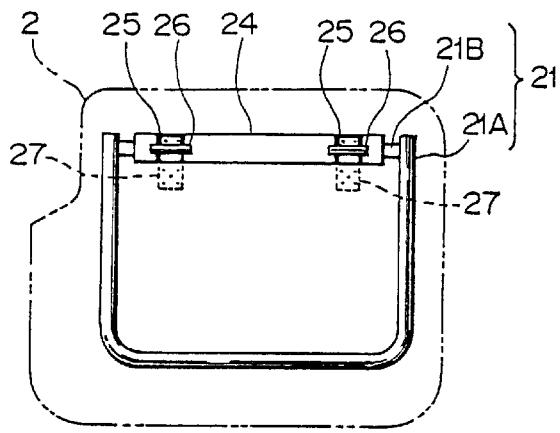
FIG. 2A is a plan view of a cushion frame of a seat main body of a right-hand passenger seat shown in FIG. 1.

As is depicted in FIG. 2A, a frame (hereinafter called "cushion frame") 21, which is arranged in the seat cushion 2 of the right-hand seat of the second seat, has a structure that a frame 21B extending in the lateral direction is fixed at opposite ends thereof to free ends of a U-shaped frame 21A which opens on a side facing the rear of the vehicle.

On an upper portion of the frame 21B laterally extending in a rear portion of the cushion frame 21, a reinforcement member 24 is secured, for example, by welding. It is to be noted that a member to which the reinforcement member 24 is secured is not limited to the cushion frame 21 and can be, for example, a laterally-extending frame (not shown) of the seatback or a vehicle floor on which the vehicle seat main body is to be mounted. An embodiment in which the reinforcement member 24 is secured on the vehicle floor will be described as the second embodiment subsequently herein. Referring next to FIG. 2A, the reinforcement member 24 is provided at two locations thereof with guide portions 25 so that they are apart from each other with a predetermined distance there between. On an upper portion of the reinforcement member 24, anchor bars 26 are fixed, for example, by welding such that the guide portions are located underneath the corresponding anchor bars 26.

Figure 2B:
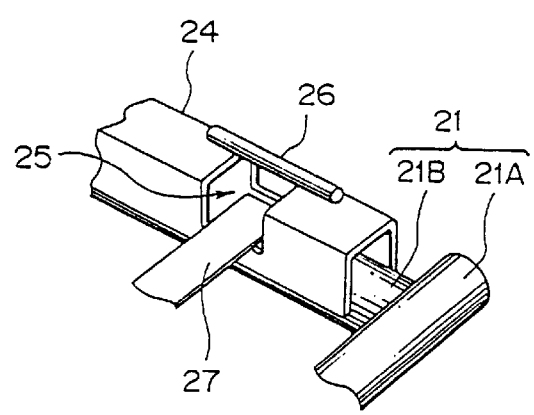
FIG. 2B is a fragmentary perspective view illustrating a guide portion depicted in FIG. 2A.
Figure 2C:
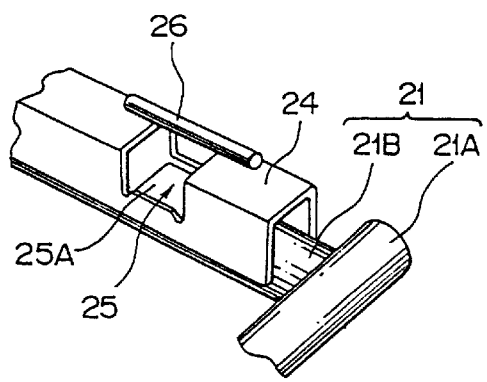
FIG. 2C is a fragmentary perspective view illustrating the guide portion with a plate arranged there.
Figure 2D:
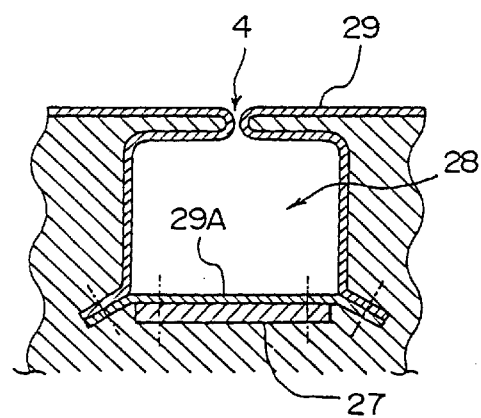
FIG. 2D is a fragmentary cross-sectional view of the vehicle seat construction taken in the direction of arrows IID—IID of FIG. 1 with a slit portion included therein (and also taken in direction of arrows IID—IID of FIG. 3)

Reference will next be had to FIG. 2B. Each of the guide portions 25 arranged in the reinforcement member 24 has a guide surface 25A underneath the corresponding anchor bar 26 such that the corresponding connector portion 13 of the child seat 10 can be guided to the anchor bar 26. Each guide portion 25 can be obtained, for example, by forming a cut through the reinforcement member 24—which is formed, for example, in a substantially inverted U shape in cross-section—at a predetermined position and then inwardly folding the resulting edge sections. As is clearly seen especially from FIG. 2D and also from FIG. 3B to be described subsequently herein, the seat cushion 2, on the other hand, has recesses 28 at locations corresponding to the respective combinations of the guide portions 25, the anchor bars 26 and the slits 4. These recesses 28 permit insertion of the connector portions of the child seat 10 to the anchor bars 26, respectively. The bottom surface of each recess 28 is formed such that it extends in continuation with the guide surface 25A of the corresponding guide portion 25. As is shown in FIGS. 2C and 2D, a plate 27 to which the corresponding connector portion 13 of the child seat 10 can be brought into sliding contact is sewn to the bottom wall of the recess 28. Described specifically, the plate 27 is sewn to a ticking 29A which makes up the bottom wall of the recess 28. Incidentally, this ticking 29A is in turn sewn at opposite side edges thereof to lower edge portions of the edge sections of the ticking 29, said edge sections having been folded into the recess 28 to define the slit portion 4. Preferably, the plate 27 may be made of a resin and may be arranged extending from the bottom surface of the recess 28 to the guide surface 25A of the guide portion 25. Incidentally, the ticking 29A extends from the bottom surface of the recess 28 to the guide surface of the guide portion 25. Owing to the existence of such plates 27, the connector portions 13 of the child seat 10 can be easily guided to the corresponding guide portions 25 and anchor bars 26.

As is shown in FIG. 2C, each anchor bar 26 is required to have a length sufficient to be firmly fixed on the upper portion of the reinforcement member with the corresponding guide portion located underneath the anchor bar 26.

Each slit portion 4 can be obtained, for example, as depicted in FIG. 2D, namely, by folding the ticking 29 into the recess 28 formed in a part of the seat cushion 2. It is to assure retention of an attractive appearance upon insertion or withdrawal of the connector portion 13 that the slit portion is constructed by folding the ticking 29. Below the ticking 29A at the bottom of the recess 28, the above-mentioned plate 27 is located. The arrangement of the ticking 29A has make it possible to similarly retain the attractive appearance even when the bottom of the recess 28 can be seen through the slit portion 4.

As has been described above, the guide portions 25 for guiding the corresponding connector portions 13 of the child seat 10 to the anchor bar 26 are arranged in this embodiment so that the fastening of the child seat 10 onto the vehicle seat main body 1 can be performed with extreme ease. In this embodiment, the resin-made plates 27 may preferably be arranged on the bottoms of the recesses 28. Owing to the arrangement of the plates 27, the connector portions 13 of the child seat 10 can be more smoothly guided on the corresponding tickings 29A to the associated guide portions 25 and anchor bars 26.

Further, the reinforcement member 24 is secured on the laterally-extending frame 21B of the seat main body 1 in this embodiment. As the relatively short anchor bars 26 are fixed on this reinforcement member 24 by welding or the like, the vehicle seat construction is structurally solid so that the anchor bars 26 are provided with improved rigidity.

As a consequence, displacements of the anchor bars 26 can be minimized even if large force is applied to the child seat 10 in the event of a collision of the vehicle.

Figure 3A:
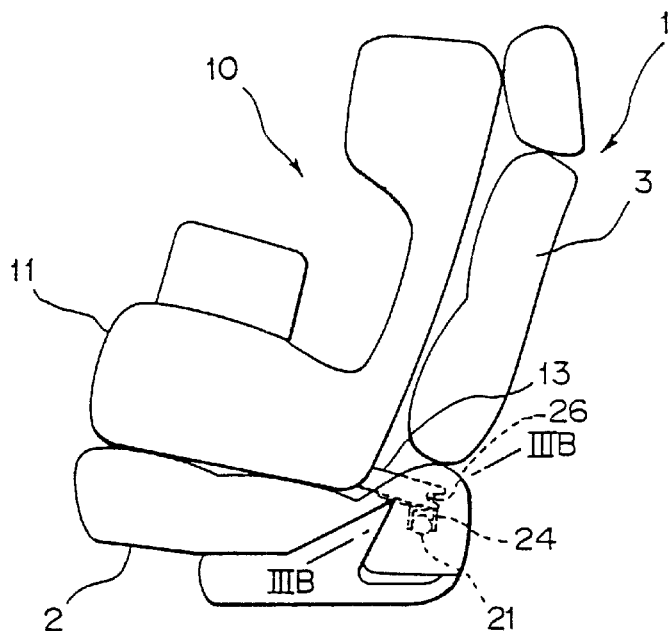
FIG. 3A is a side view of the seat main body with a child seat fastened thereon.
Figure 3B:
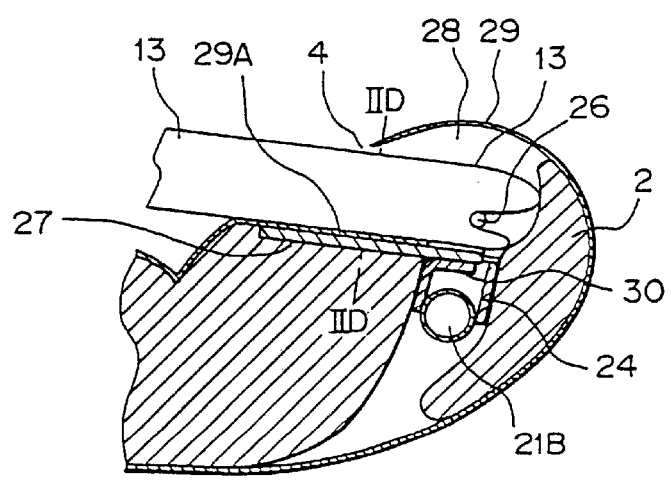
FIG. 3B is a fragmentary cross-sectional view taken in the direct on of arrows IIIB—IIIB of FIG. 3A.

With reference to FIGS. 3A and 3B, a description will next be made about the fastening and removal of the child seat 10 to and from the seat main body 1. To fasten the child seat 10, the connector portions 13 arranged on the child seat main body 11 are firstly inserted into the corresponding slit portions 4 of the seat cushion 2. When the child seat 10 is then pushed toward the seatback 3, the connector portions 13 are caused to smoothly reach the corresponding guide portions 25 and anchor bars 26 while being guided by the associated plates 27. Unillustrated latch mechanisms are then actuated so that the connector portions 13 are surely brought into fixed engagement with the corresponding anchor bars 26.

To remove the child seat 10, on the other hand, a knob or the like—which is operably connected via wires or the like to a member for releasing the latch mechanisms and is arranged at a desired location of the child seat 10—is operated to release the above-mentioned latch mechanisms, followed by the withdrawal of the child seat 10 toward the front of the vehicle. As a result, the connector portions 13 are caused to separate from the corresponding anchor bars 26 and to move along the associated guide portions 25, plates 27 and recesses 28, so that the child seat 10 can be smoothly removed from the seat main body 1. After the child seat 10 has been removed from the seat main body 1, the slit portions 4 are closed up by the restoring force of the ticking 29. The appearance of the seat cushion 2 is therefore not derogated, leading to improved attraction to the eye.

As has been described above, the reinforcement member 24 is secured on the laterally-extending frame 21B of the seat main body 1, and the anchor bars 26 are secured on the reinforcement member 24. The anchor bars 26 are therefore provided with improved rigidity so that in the event of a collision of the vehicle, displacements of the anchor bars 26 can be minimized. This can obviate the need for an advance application of substantial reinforcement to the frame of the seat cushion 2. Further, the arrangement of the guide portions 25, which serve to guide the connector portions 13 of the child seat 10 to the corresponding anchor bars 26, makes it possible to fasten the child seat 10 onto the vehicle seat main body 1 with extreme ease.

Figure 4A:
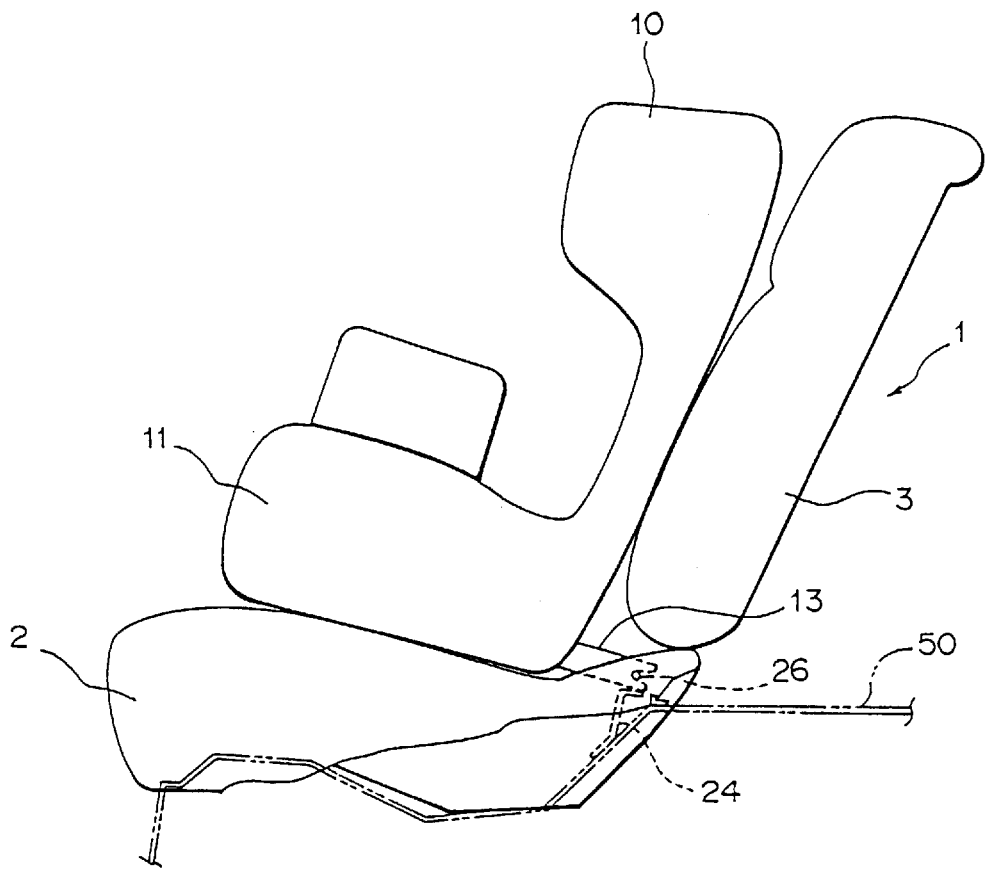
FIG. 4A is a side of a vehicle seat construction according to a second embodiment of the present invention, in which a reinforcement member is secured on a vehicle floor, with a child seat fastened thereon.
Figure 4B:
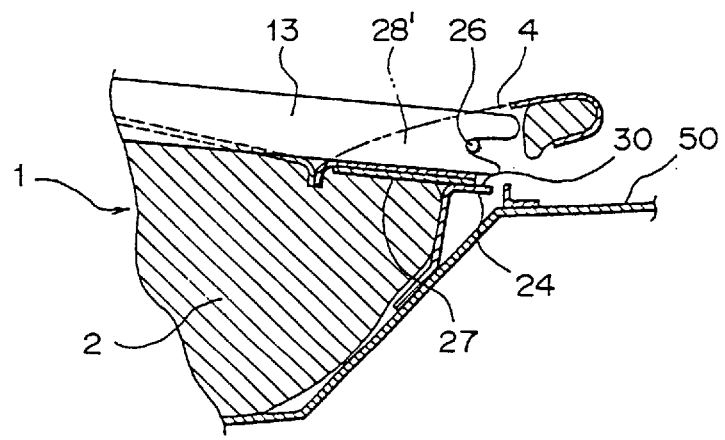
FIG. 4B is an enlarged fragmentary cross-sectional view of the vehicle seat construction of FIG. 4A.
Figure 5:
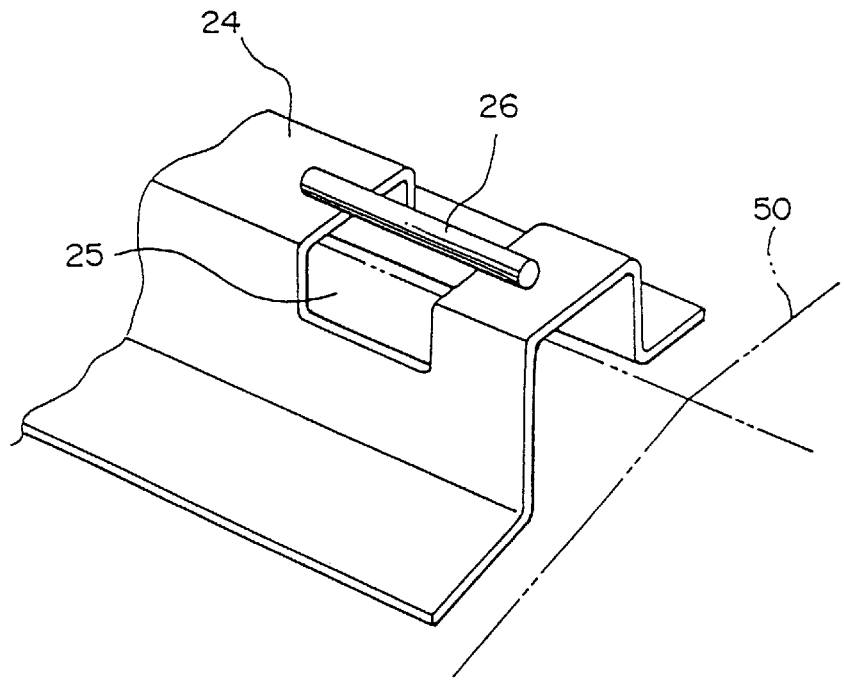
FIG. 5 is a fragmentary perspective view illustrating the reinforcement member secured to the vehicle floor.

With reference to FIGS. 4A, 4B and 5, a description will next be made about the vehicle seat construction according to the second embodiment of the present invention in which a reinforcement member is secured on a vehicle floor. In these drawings, elements of structure similar to their corresponding elements in FIGS. 1 to 3B will be designated by like reference numerals.

As is illustrated in FIG. 4A, each seat main body 1 which constitutes, for example, a second seat is mounted on a vehicle floor 50. Further, as is shown in FIGS. 4A, 4B and 5, the reinforcement member 24 is secured by welding on the vehicle floor 50 in a vicinity of a location corresponding to a rear end of a seat cushion 2. As in the first embodiment, this reinforcement member 24 is provided with guide portions 25 at two locations apart from each other with a predetermined distance therebetween. On an upper portion of the reinforcement member 24, anchor bars 26 are fixed, for example, by-welding such that the corresponding guide portions 25 are located underneath the anchor bars 26.

Similarly to the first embodiment described above, each of the guide portions 25 arranged in the reinforcement member 24 has a guide surface 25A underneath the corresponding anchor bar 26 such that the corresponding connector portion 13 of the child seat 10 can be guided to the anchor bar 26. Each guide portion 25 can be obtained, for example, by forming a cut through the reinforcement member 24—which is formed, for example, in a substantially inverted, flattened U shape in cross-section—at a predetermined position and then inwardly folding the resulting edge sections. As is clearly seen especially from FIGS. 4A and 4B, the seat cushion 2 has recesses 28' at locations corresponding to the respective combinations of the guide portions 25, the anchor bars 26 and the slits 4. These recesses 28' permit insertion of the connector portions of the child seat 10 to the corresponding anchor bars 26 through the seat cushion 2. These recesses 28' are different from the above-described recesses 28 in that the connector portions 13 extend through the seat cushion 2. The bottom surface of each recess 28' is formed such that it extends in continuation with the guide surface 25A of the corresponding guide portion 25. As is shown in FIG. 4B, a plate 27 to which the corresponding connector portion 13 of the child seat 10 can be brought into sliding contact is sewn to the bottom wall of the recess 28'. The plate 27 is sewn to a ticking which makes up the bottom wall of the recess 28'. The plate 27 may preferably be made of a resin. This plate 27 is also arranged extending from the bottom surface of the recess 28' to the guide surface 25A of the guide portion 25. Owing to the arrangement of such plates 27, the connector portions 13 of the child seat 10 can be easily guided to the corresponding guide portions 25 and anchor bars 26.

As has been described above, the guide portions 25 for guiding the corresponding connector portions 13 of the child seat 10 to the anchor bar 26 are arranged in this embodiment so that the fastening of the child seat 10 onto the vehicle seat main body 1 can be performed with extreme ease. Owing to the arrangement of the plates 27, the connector portions 13 of the child seat 10 can be more smoothly guided to the associated guide portions 25 and anchor bars 26.

Further, the reinforcement member 24 is secured on the vehicle floor 50 in this embodiment. As the relatively short anchor bars 26 are fixed on this reinforcement member 24 by welding or the like, the vehicle seat construction is structurally solid so that the anchor bars 26 are provided with improved rigidity.

As a consequence, displacements of the anchor bars 26 can be minimized even if large force is applied to the child seat 10 in the event of a collision of the vehicle.

To fasten the child seat 10 in this embodiment, the connector portions 13 arranged on the child seat main body 11 are also inserted firstly into the corresponding slit portions 4 of the seat cushion 2. When the child seat 10 is then pushed toward the seatback 3, the connector portions 13 are caused to smoothly reach the corresponding guide portions 25, which are arranged in the reinforcement member 24 secured on the vehicle floor 50, and further, the corresponding anchor bars 26 while being guided by the associated plates 27 through the seat cushion 2. Unillustrated latch mechanisms are then actuated so that the connector portions 13 are surely brought into fixed engagement with the corresponding anchor bars 26.

To remove the child seat 10, on the other hand, the latch mechanisms are released, followed by the withdrawal of the child seat 10 toward the front of the vehicle, as in the first embodiment described above. As a result, the connector portions 13 are caused to separate from the corresponding anchor bars 26 and to move along the associated guide portions 25, plates 27 and recesses 28', so that the child seat 10 can be smoothly removed from the seat main body 1. After the child seat 10 has been removed from the seat main body 1, the slit portions 4 are closed up by the restoring force of the ticking 29. The appearance of the seat cushion 2 is therefore not derogated, leading to improved attraction to the eye.

As described above, the reinforcement member 24 is secured on the vehicle floor 50, and the anchor bars 26 are secured on the reinforcement member 24. The anchor bars 26 are therefore provided with improved rigidity so that in the event of a collision of the vehicle, displacements of the anchor bars 26 can be minimized. This can obviate the need for an advance application of substantial reinforcement to the vehicle floor 50. Further, the arrangement of the guide portions 25, which serve to guide the connector portions 13 of the child seat 10 to the corresponding anchor bars 26, makes it possible to fasten the child seat 10 onto the vehicle seat main body 1 with extreme ease.

In each of the above-described embodiments, each plate 27 was arranged extending onto a guide flange 30 (see FIG. 4B) which constitutes the guide surface 25A of the guide portion 25. It is however not absolutely necessary to arrange the plate 27 so. The length of the plate 27 may be limited such that it extends only to a point shortly forward of the guide portion 25. Each guide flange 30 has been formed by partially punching a hole in the reinforcement member 24 and bending down the one side as a louver (in other words, by lancing the reinforcement member 24). However, the guide flanges 30 are not limited to the illustrated example, and separate member provided as additional components may be used.

Figure 6:
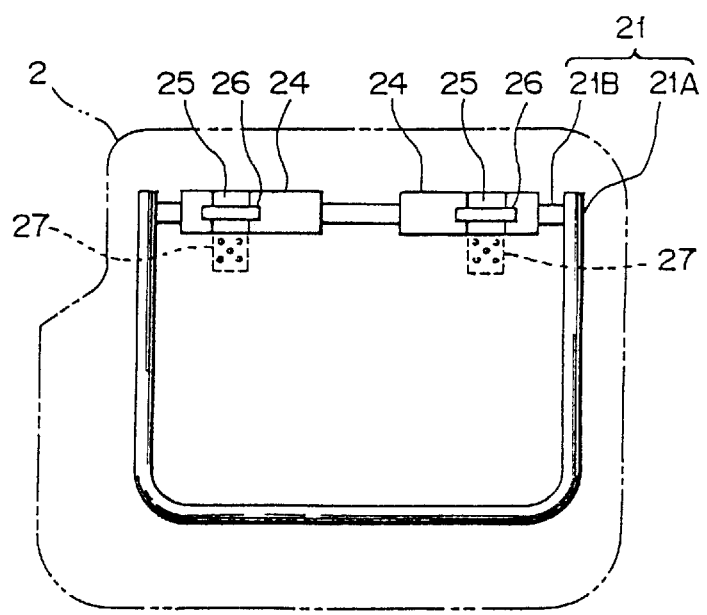
FIG. 6 is similar to FIG. 2A, and illustrates a modification of the reinforcement member in which the reinforcement member is formed as a two-piece unit.

In the above-described embodiments, the guide portions 25 were formed in a pair in the single reinforcement member 24. As an alternative, it is possible to furnish two reinforcement members, each of which has a single guide portion formed therein, and to secure these reinforcement members on a frame of a seat main body or on the vehicle floor with a predetermined distance left between the reinforcement members. A modification of the first embodiment, in which two reinforcement members 24' are secured on a frame 21B of a seat main body 1, is illustrated in FIG. 6. Although a drawing of another modification in which two reinforcement members are arranged on the vehicle floor 50 is omitted herein, these reinforcement members can obviously be secured likewise onto a vehicle floor.

What is claimed is:

1. A vehicle seat construction comprising:
   a vehicle seat main body having a seat cushion and a seatback;
   a reinforcement member secured on a frame of said vehicle seat main body and adapted to be secured to a floor on which said vehicle seat main body is to be mounted;
   an anchor member fixed only to a top surface of said reinforcement member so that a connector portion of a child seat can be releasably engaged to the anchor member; and
   a guide portion arranged in said reinforcement member such that said connector portion of said child seat is guided to said anchor member.

2. The vehicle seat construction according to claim 1, wherein:
   said anchor member is a straight anchor bar; and
   said guide portion has a guide surface arranged underneath said anchor bar.

3. The vehicle seat construction according to claim 2, wherein:
   said reinforcement member has a cross-section of a substantially inverted U-shape; and
   said guide portion has been formed by bending a portion of said reinforcement member.

4. The vehicle seat construction according to claim 1, wherein:
   said anchor member is arranged in a vicinity of a rear end portion of said seat cushion; and
   said seat cushion is provided at said rear end portion thereof with a recess into which said connector portion can be inserted.

5. A vehicle seat construction comprising:
   a vehicle seat main body having a seat cushion and a seatback;
   a reinforcement member secured on a frame of said vehicle seat main body and adapted to be secured to a floor on which said vehicle seat main body is mounted;
   an anchor member fixed on said reinforcement member for releasable engagement with a connector portion of a child seat;
   a guide portion arranged in said reinforcement member such that said connector portion of said child seat is guided to said anchor member;
   said seat cushion is provided with a ticking which covers an opening of said recess; and
   said ticking has a slit portion to permit insertion of said connector portion into said recess.

6. A vehicle seat construction according to claim 4, wherein:
   said anchor member is a straight anchor bar;
   said guide portion has a guide surface arranged underneath said anchor bar; and
   said recess is formed with a bottom surface thereof extending in continuation with said guide surface.

7. A vehicle seat construction comprising:
   a vehicle seat main body having a seat cushion and a seatback;

a reinforcement member secured on a frame of said vehicle seat main body and adapted to be secured to a floor on which said vehicle seat main body is mounted;

an anchor member fixed on said reinforcement member for releasable engagement with a connector portion of a child seat;

guide portion arranged in said reinforcement member such that said connector portion of said child seat is guided to said anchor member; and further comprising a resin-made plate arranged on said bottom surface of said recess such that said connector portion can be brought into sliding contact with said connector portion.

8. A vehicle seat construction according to claim 7, wherein said plate extends onto said guide surface.

9. The vehicle seat construction according to claim 1, wherein:

said child seat is provided with two connector portions;

two anchor members as defined in claim 1 are fixed at a predetermined interval therebetween on said reinforcement member for releasable engagement with the corresponding connector portions of said child seat; and said anchor members are provided with two guide portions, respectively, such that said connector portions of said child seat are guided to the corresponding anchor members.

10. The vehicle seat construction according to claim 1, wherein:

said child seat is provided with two connector portions;

two reinforcement members as defined in claim 1 are secured at a predetermined interval therebetween on one of said frame and a floor on which the two reinforcement members are adapted to be mounted;

two anchor members as defined in claim 1 are fixed on said reinforcement members, respectively, for releasable engagement with the corresponding connector portions of said child seat; and said anchor members are provided with guide portions, respectively, such that said connector portions of said child seat are guided to the corresponding anchor members.

11. The vehicle seat construction according to claim 1, wherein only end portions of the anchor member are fixed to the top surface.

12. The vehicle seat construction according to claim 11, wherein:

said anchor member is a straight anchor bar; and said guide portion has a guide surface located underneath said anchor bar.

13. A vehicle seat construction comprising:

a vehicle seat main body having a seat cushion and a seatback;

a reinforcement member, which has a cross-section of a substantially inverted U-shaped, secured on a frame of said vehicle seat main body;

a guide portion formed by bending a portion of said reinforcement member, such that a connector portion of a child seat is guided, and an anchor member fixed on an upper portion of said reinforcement member with guide portion located underneath said anchor member for releasable engagement with said connector portion of said child seat.

* * * * *